United States Patent [19]
Kii et al.

[11] Patent Number: 5,499,703
[45] Date of Patent: Mar. 19, 1996

[54] PEAK TORQUE DECREASING APPARATUS FOR AN AUTOMOBILE POWER TRAIN

[75] Inventors: Masayuki Kii; Hiroaki Nimura; Mitsuhiro Umeyama, all of Toyota, Japan

[73] Assignee: Toyota Jidosha Kabushiki Kaisha, Toyota, Japan

[21] Appl. No.: 144,571

[22] Filed: Oct. 22, 1993

[30] Foreign Application Priority Data

Oct. 23, 1992 [JP] Japan ................................. 4-285601
Oct. 6, 1993 [JP] Japan ................................. 5-250277

[51] Int. Cl.$^6$ ........................... F16D 13/50; F16F 15/30
[52] U.S. Cl. ..................... 192/70.11; 192/30 V; 74/574
[58] Field of Search ........................ 192/30 V, 70.11, 192/70.17, 70.18; 74/574

[56] References Cited

U.S. PATENT DOCUMENTS

| | | | |
|---|---|---|---|
| 4,790,419 | 12/1988 | Loizeau | 192/70.18 |
| 4,796,740 | 1/1989 | Fukushima | 192/30 V |
| 5,168,971 | 12/1992 | Kovac | 192/30 V |

FOREIGN PATENT DOCUMENTS

| | | |
|---|---|---|
| 2428176 | 1/1980 | France . |
| 2479750 | 10/1981 | France . |
| 2539683 | 7/1984 | France . |
| 2559433 | 8/1985 | France . |
| 3941250 | 12/1989 | Germany . |
| 61-201930 | 9/1986 | Japan . |
| 62-106028 | 7/1987 | Japan . |
| 63-243545 | 10/1988 | Japan . |
| 63-246529 | 10/1988 | Japan . |
| 2125120 | 2/1984 | United Kingdom . |

OTHER PUBLICATIONS

Patent Abstracts of Japan, vol. 13, No. 36 (M–790)(3384) 26 Jan. 1989.

Primary Examiner—Richard M. Lorence
Attorney, Agent, or Firm—Cushman, Darby & Cushman

[57] ABSTRACT

An idler mass member is provided inside or outside a torque transmittance path including a clutch for connecting and disconnecting an engine side and a transmission side having a synchromesh. The idler mass member is detached from a power train when the clutch is disengaged and is brought into contact or engagement with a driven side of the power train when or before the clutch is moved to be engaged. Due to the idler mass member, a peak torque generated in the driven side at a rushed start of an automobile is decreased.

3 Claims, 17 Drawing Sheets

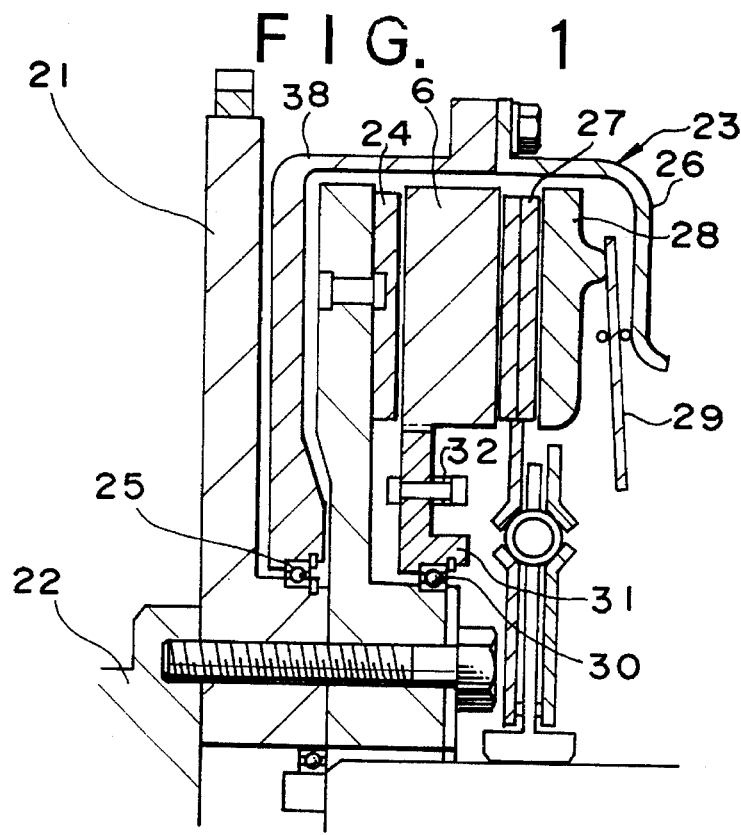
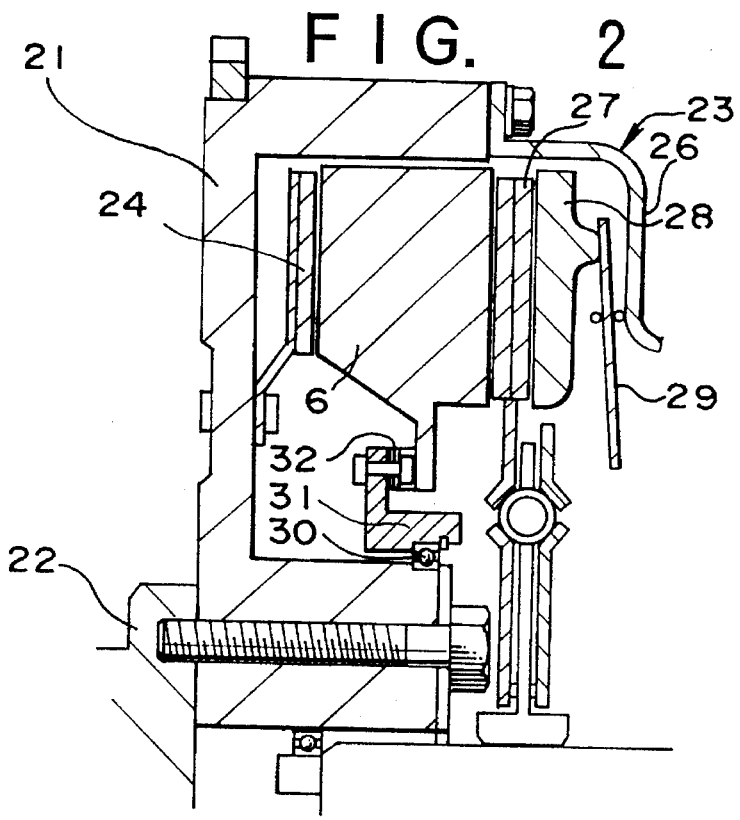

TE : ENGINE INPUT TORQUE

Tc : TRANSMITTED TORQUE

TF : TIRE SLIP TORQUE

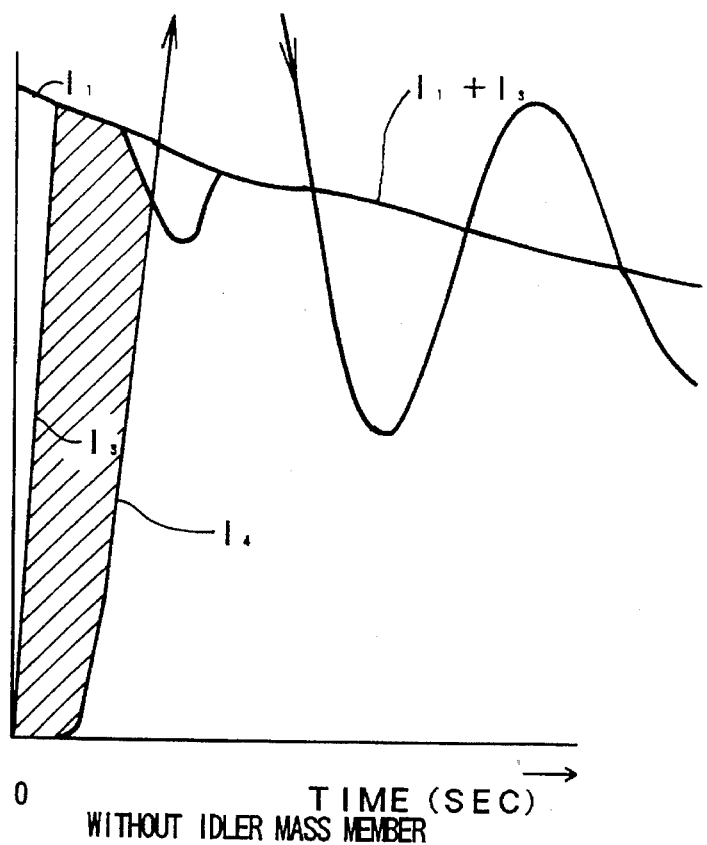

PEAK TORQUE DECREASING APPARATUS FOR AN AUTOMOBILE POWER TRAIN

BACKGROUND OF THE INVENTION

1. Field of the Invention

The present invention relates to a peak torque decreasing apparatus for decreasing peak torques generated in an automobile power train.

2. Description of the Related Art

Lightening automobiles for the purpose of improving fuel economy is desirable. Power train members, i.e., a transmission, a propeller shaft, a differential, and an axle shaft, could have their masses and sizes decreased to lighten an automobile.

The masses and sizes of power train members are changed according to the magnitudes of peak torques generated at a rapid start of the automobile (i.e., at sudden clutch connection at a high engine speed), because the power train members are designed to bear the peak torques. Therefore, if the peak torques are decreased, the power train members can be lightened and down-sized.

As a device for cutting peak torques, a torque limiter is known as disclosed in Japanese Utility Model Publication SHO 62-106028. Such a torque limiter cuts torques that are greater than a predetermined torque which is determined by a frictional characteristic of the facing surface of the torque limiter.

However, the predetermined torque of the torque limiter changes according to abrasion of the facing. As a result, a stable torque limiting characteristic cannot be obtained. In addition, once sticking occurs, the torque limiting function does not operate further.

SUMMARY OF THE INVENTION

An object of the invention is to provide a peak torque decreasing apparatus which can reliably decrease peak torques generated in an automobile power train at, for example, rushed start of the automobile.

This object can be achieved by a peak torque decreasing apparatus for an automobile power train in accordance with the present invention which includes (a) a clutch for connecting and disconnecting a drive side and a driven side having a synchromesh, and (b) an idler mass member adapted to freely rotate when the clutch is disengaged and to be brought into contact with the driven side when or before the clutch is moved to be engaged.

In the apparatus of the invention, the idler mass member having a predetermined mass is brought into contact with the driven side on or before engagement of the clutch, and bears a portion of the energy generated in the power train at a rushed start of the automobile to decrease torques generated in the driven side of the power train. Because of this decrease in the torques generated in the power train, the power train members can be downsized and lightened through optimizing the strength of the power train members.

If the inertial mass of the clutch disk were increased, the peak torques at a rushed start would be decreased like the present invention. However, increasing the inertial mass of the clutch disk would deteriorate the operation of the synchromesh of the transmission. In contrast, in the present invention, since the idler mass member comprises a member separated from the clutch disk and is detached from the driven side when the clutch is disengaged, normal operation of the synchromesh and a decrease in peak torques are both possible.

BRIEF DESCRIPTION OF THE DRAWINGS

The above and other objects, features, and advantages of the present invention will become more apparent and will be more readily appreciated from the following detailed description of the preferred embodiments of the invention taken in conjunction with the accompanying drawings, in which:

FIG. 1 is a cross-sectional view of an upper half portion of a peak torque decreasing apparatus in accordance with a first embodiment of the invention;

FIG. 2 is a cross-sectional view of an upper half portion of a peak torque decreasing apparatus in accordance with a second embodiment of the invention;

FIG. 24 is a graphical presentation of an angular speed versus time characteristic of a peak torque decreasing apparatus which has the same structure as that of the apparatus of the fifth embodiment of the invention except the idler mass member thereof and has no idler mass member;

FIG. 25 is a graphical presentation of an angular speed versus time characteristic of the peak torque decreasing apparatus in accordance with the fifth embodiment of the invention;

DETAILED DESCRIPTION OF THE PREFERRED EMBODIMENTS

Eleven embodiments of the invention will be explained below.

A first embodiment of the invention is illustrated in FIGS. 1, 12, 27, and 28, wherein an idler mass member is disposed in a torque transmittance path.

Figure 13:
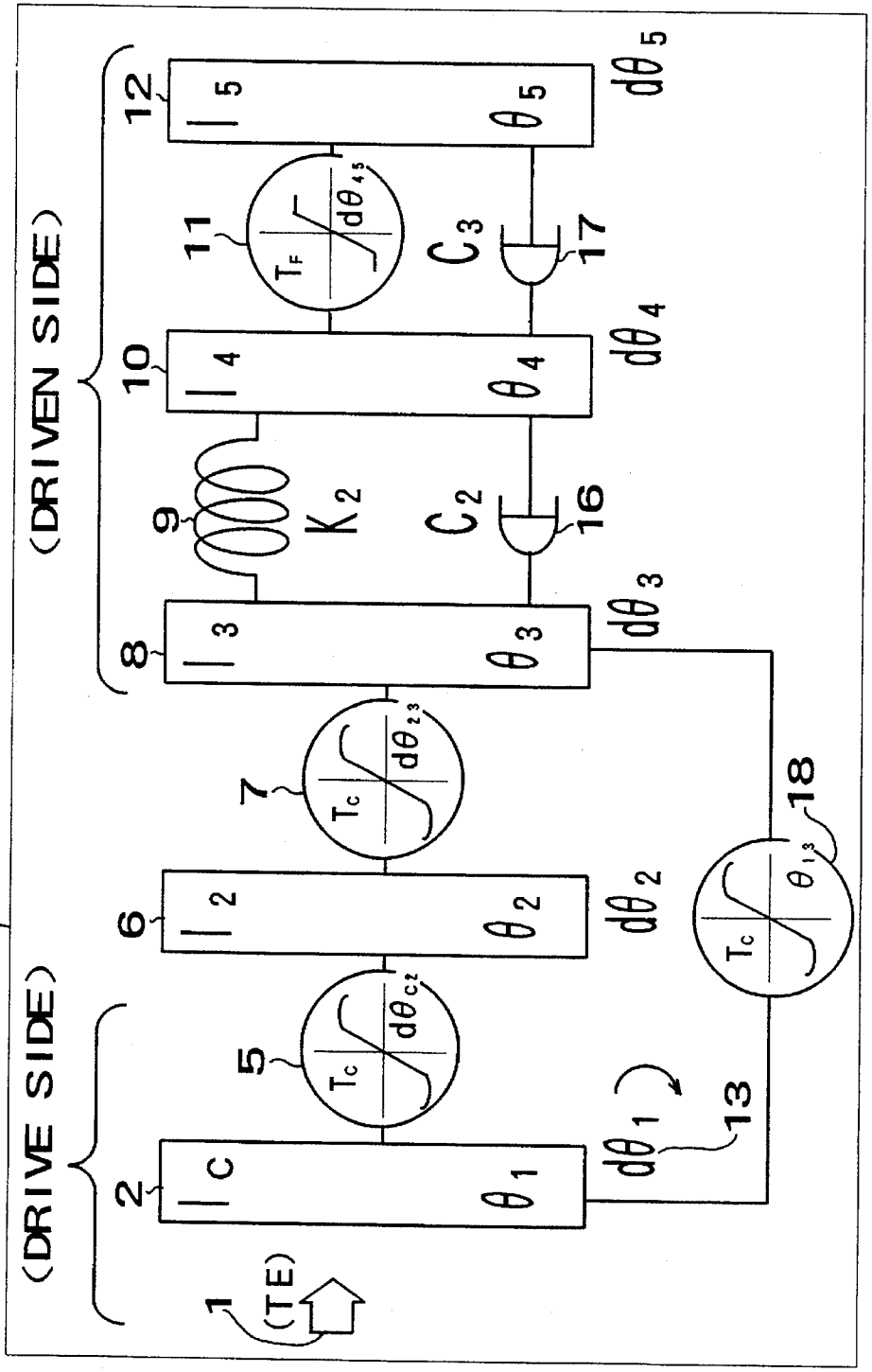
FIG. 13 is a diagram of an analysis model of the peak torque decreasing apparatus in accordance with the second embodiment of the invention.

A second embodiment of the invention is illustrated in FIGS. 2 and 13, wherein a torque transmittance path includes two path portions parallel with each other and an idler mass member is disposed in one of the two path portions and wherein an integral-type flywheel is included.

Figure 3:
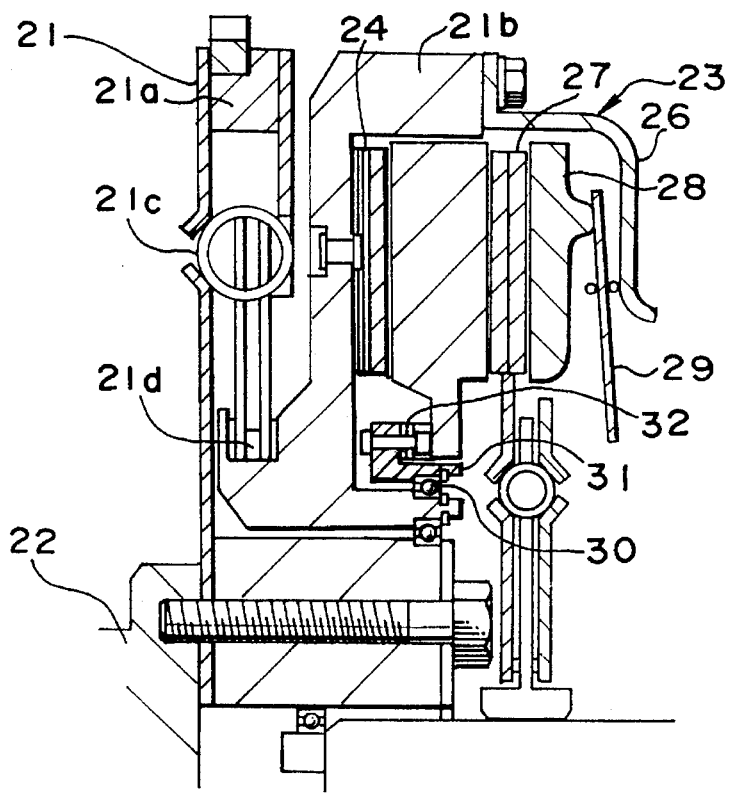
FIG. 3 is a cross-sectional view of an upper half portion of a peak torque decreasing apparatus in accordance with a third embodiment of the invention.
Figure 14:
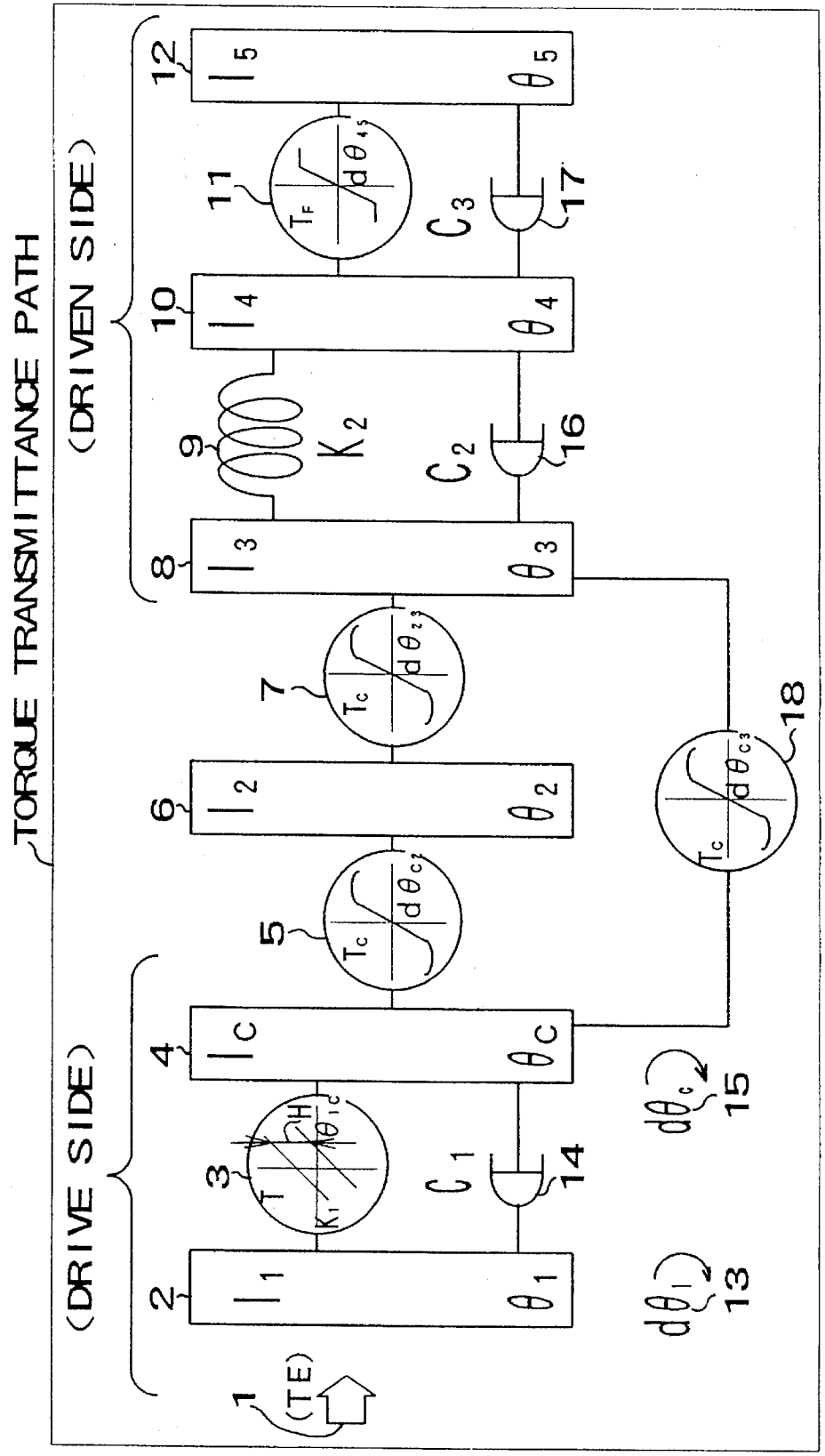
FIG. 14 is a diagram of an analysis model of the peak torque decreasing apparatus in accordance with the third embodiment of the invention.

A third embodiment of the invention is illustrated in FIGS. 3 and 14, wherein a torque transmittance path includes two path portions parallel with each other, and an idler mass member is disposed in one of the two path portions and wherein a divisional-type flywheel is included.

Figure 4:
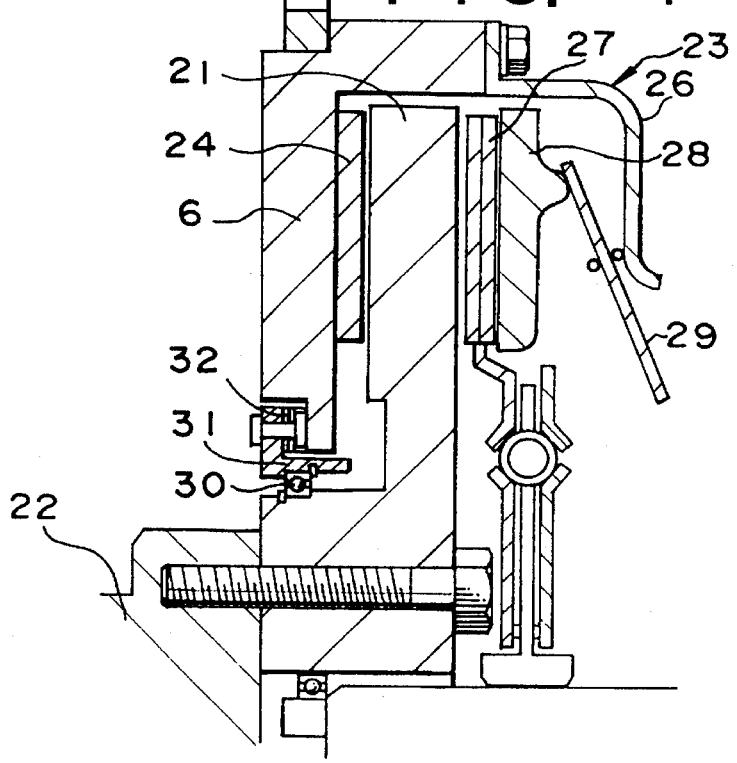
FIG. 4 is a cross-sectional view of an upper half portion of a peak torque decreasing apparatus in accordance with a fourth embodiment of the invention.
Figure 15:
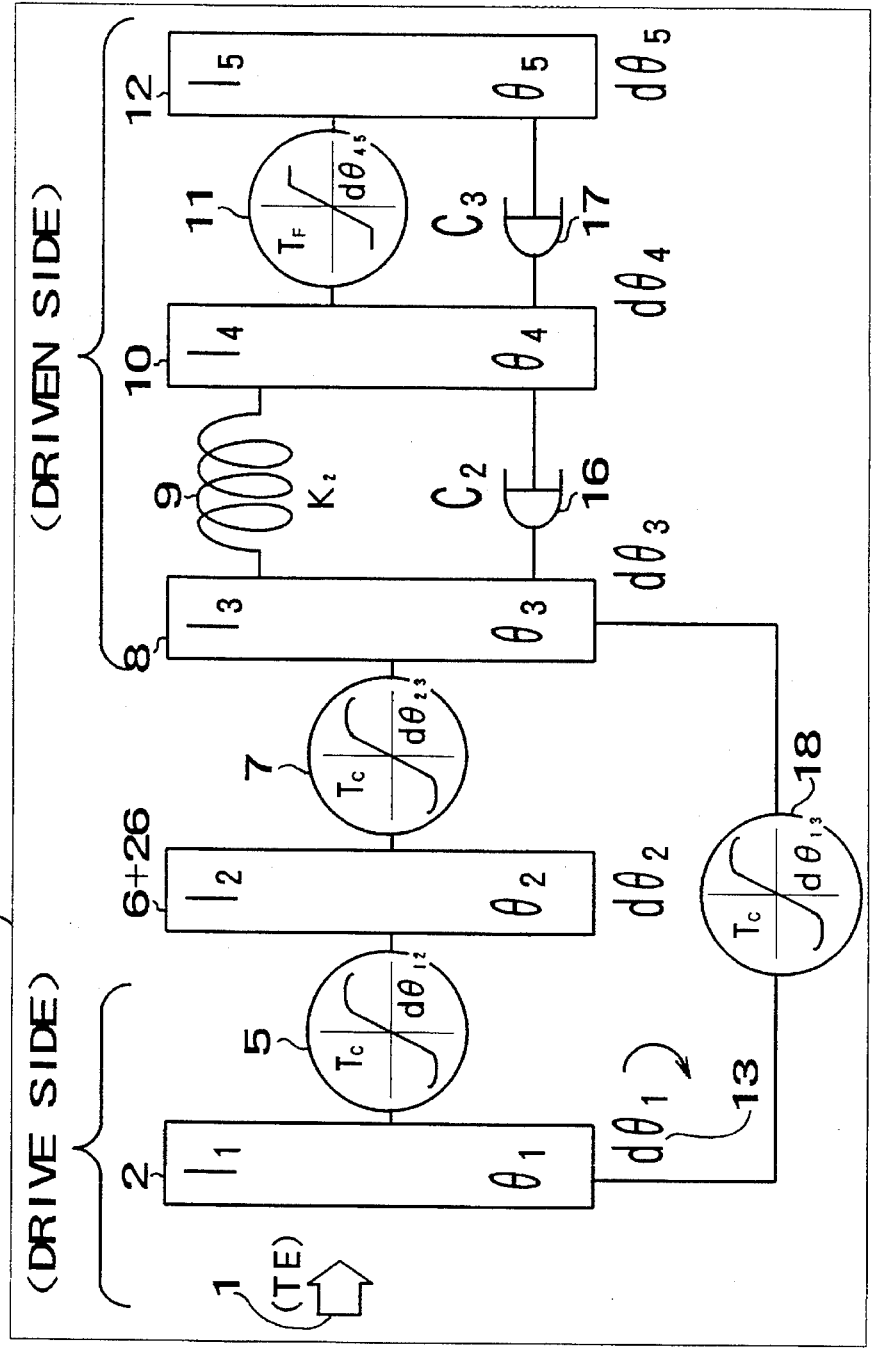
FIG. 15 is a diagram of an analysis model of the peak torque decreasing apparatus in accordance with the fourth embodiment of the invention.

A fourth embodiment of the invention is illustrated in FIGS. 4 and 15, wherein a torque transmittance path includes two path portions parallel with each other and an idler mass member is disposed in one of the two path portions and wherein the idler mass member is integrally coupled with a clutch cover.

Figure 5:
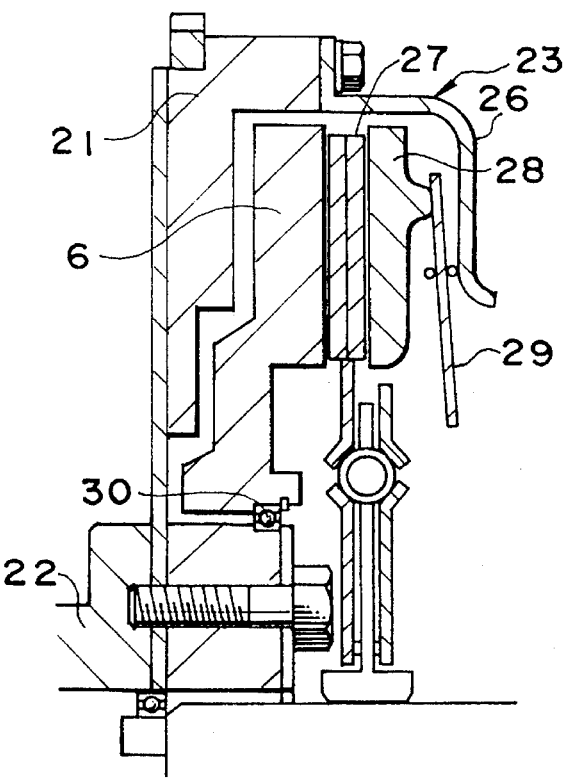
FIG. 5 is a cross-sectional view of an upper half portion of a peak torque decreasing apparatus in accordance with a fifth embodiment of the invention.
Figure 16:
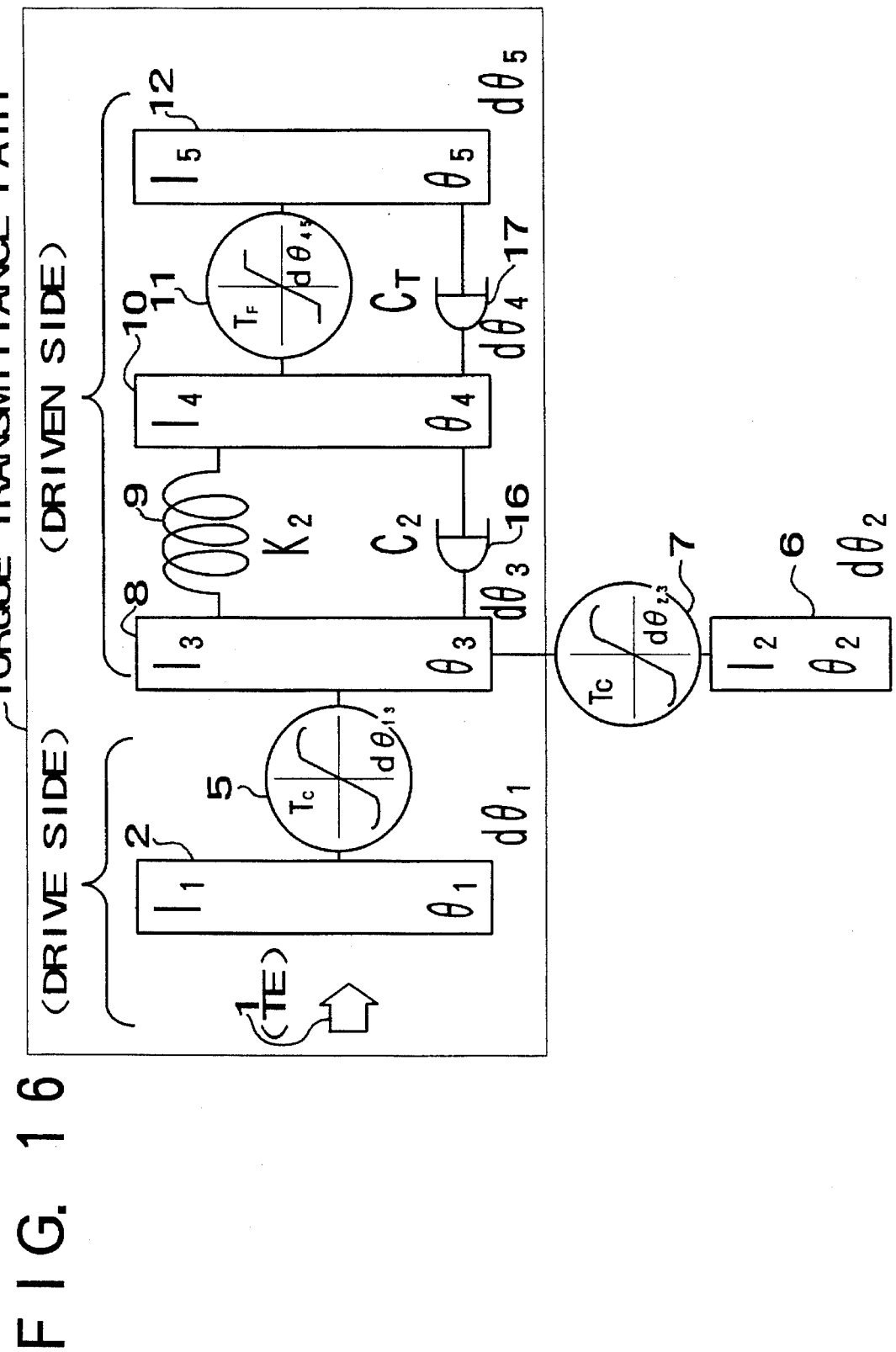
FIG. 16 is a diagram of an analysis model of the peak torque decreasing apparatus in accordance with the fifth embodiment of the invention.

A fifth embodiment of the invention is illustrated in FIGS. 5 and 16, wherein an idler mass member is disposed outside a torque transmittance path.

Figure 6:
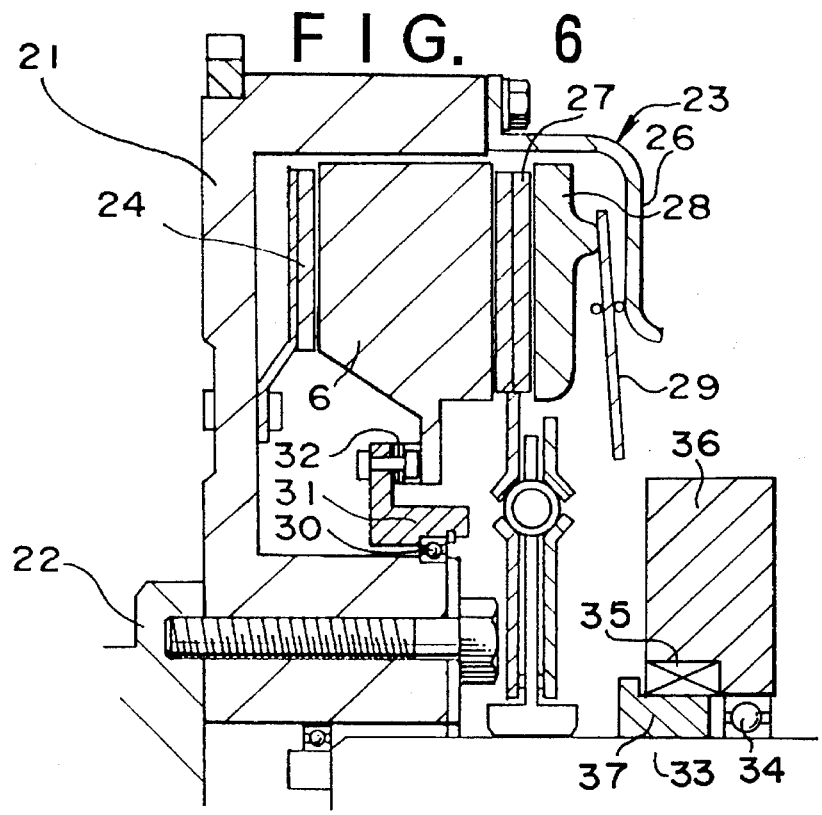
FIG. 6 is a cross-sectional view of an upper half portion of a peak torque decreasing apparatus in accordance with a sixth embodiment of the invention.
Figure 17:
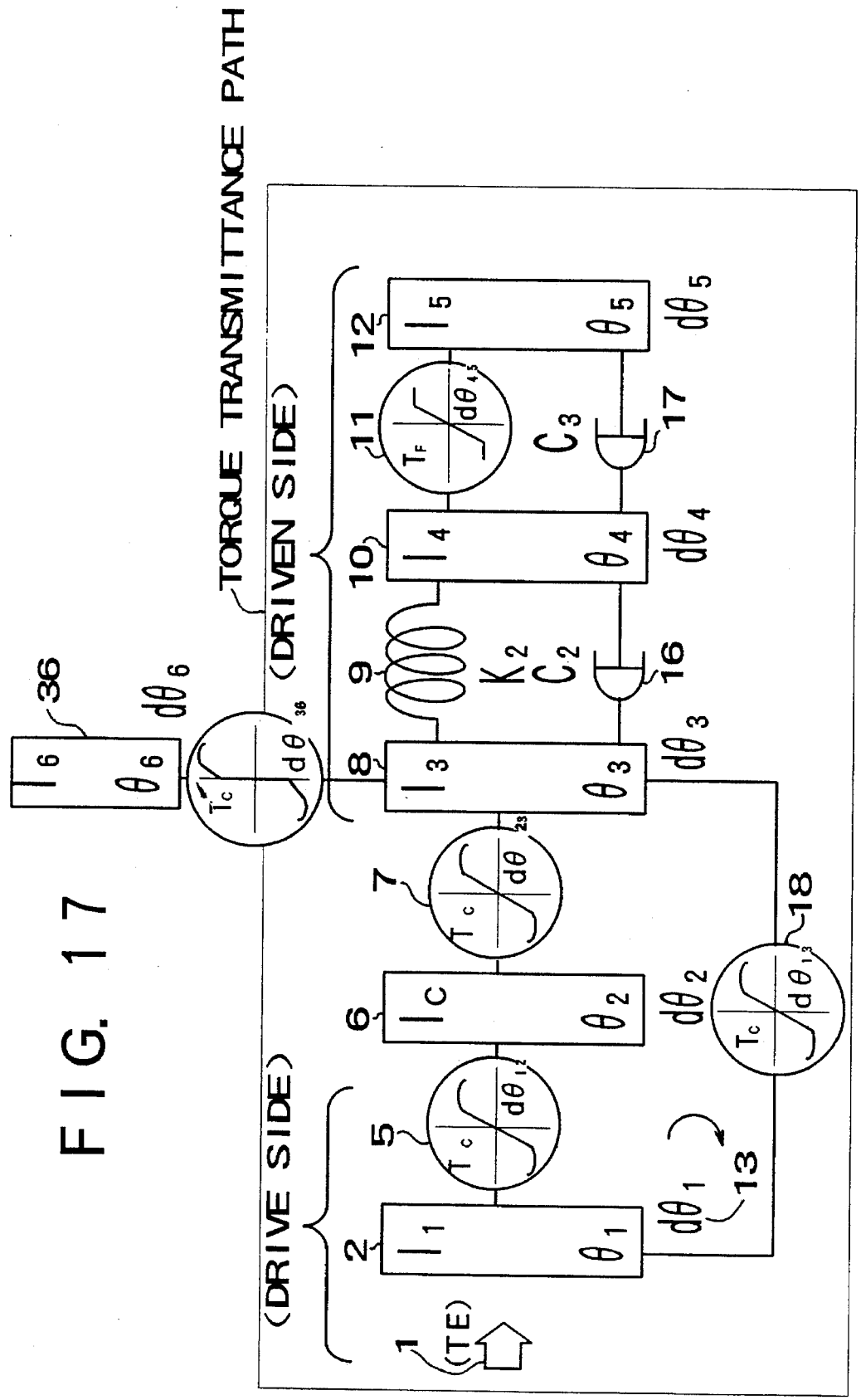
FIG. 17 is a diagram of an analysis model of the peak torque decreasing apparatus in accordance with the sixth embodiment of the invention.

A sixth embodiment of the invention is illustrated in FIGS. 6 and 17, wherein two idler mass members are provided: one is disposed in a torque transmittance path and another is disposed outside the torque transmittance path.

Figure 7:
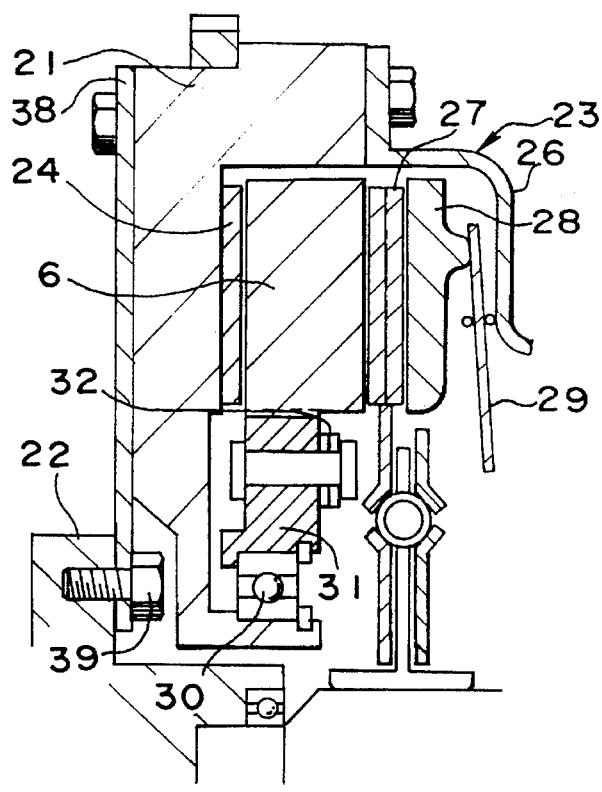
FIG. 7 a cross-sectional view of an upper half portion of a peak torque decreasing apparatus in accordance with a seventh embodiment of the invention.

A seventh embodiment of the invention is illustrated in FIG. 7 and is an improvement in down-sizing of the second and sixth embodiments of the invention.

Figure 8:
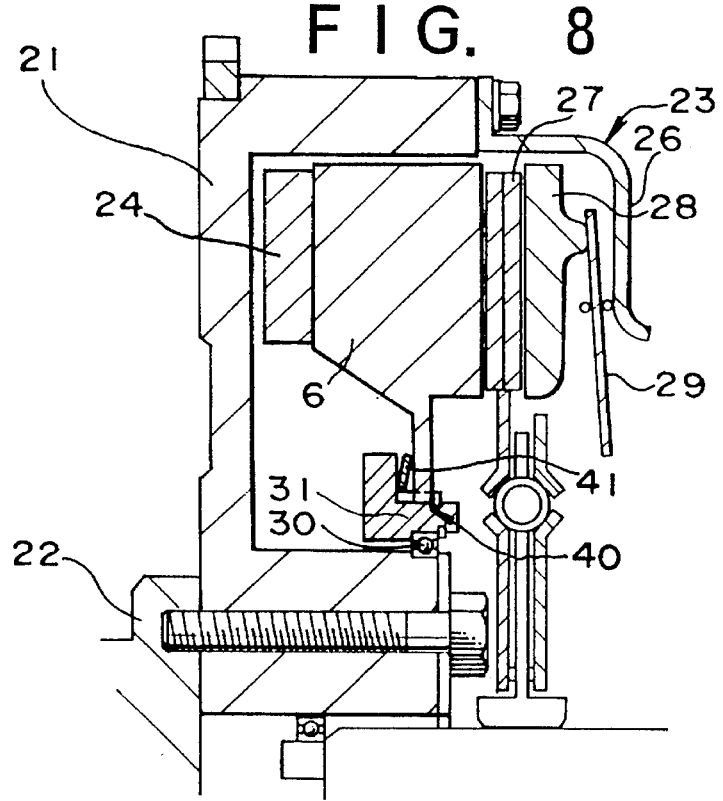
FIG. 8 is a cross-sectional view of an upper half portion of a peak torque decreasing apparatus in accordance with an eighth embodiment of the invention.

An eighth embodiment of the invention is illustrated in FIG. 8 and is an alteration of the second embodiment of the invention, wherein an idler mass member is axially moved by means of a spline and a cone spring.

Figure 9:
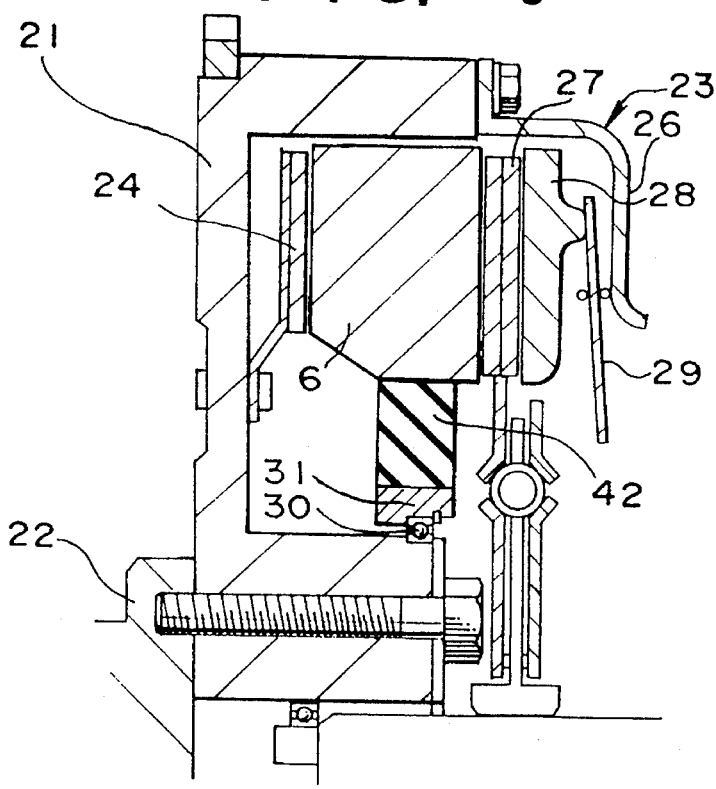
FIG. 9 is a cross-sectional view of an upper half portion of a peak torque decreasing apparatus in accordance with a ninth embodiment of the invention.

A ninth embodiment of the invention is illustrated in FIG. 9 and is an alteration of the second embodiment of the invention, wherein an idler mass member is axially movable by means of a rubber member.

Figure 10:
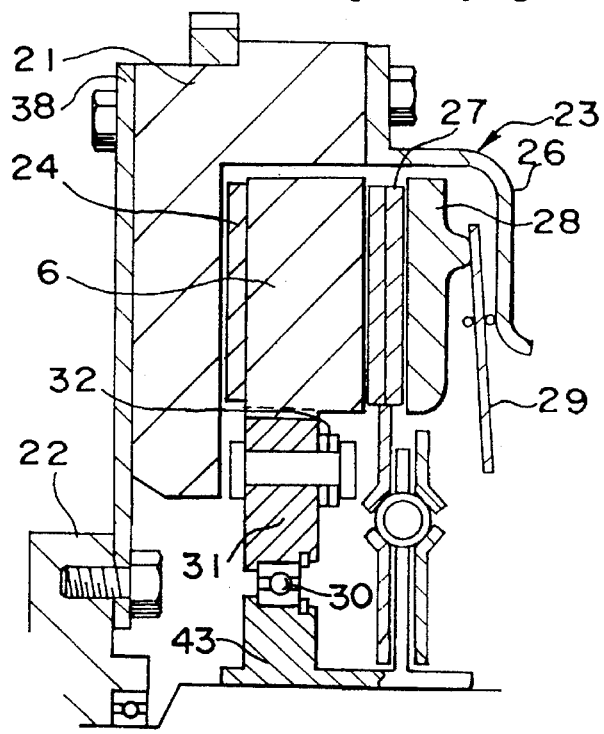
FIG. 10 is a cross-sectional view of an upper half portion of a peak torque decreasing apparatus in accordance with a tenth embodiment of the invention.

A tenth embodiment of the invention is illustrated in FIG. 10 and is an improvement of the second embodiment of the invention, wherein an idler mass member is coupled with a clutch disk so that maintenance is easy.

Figure 11:
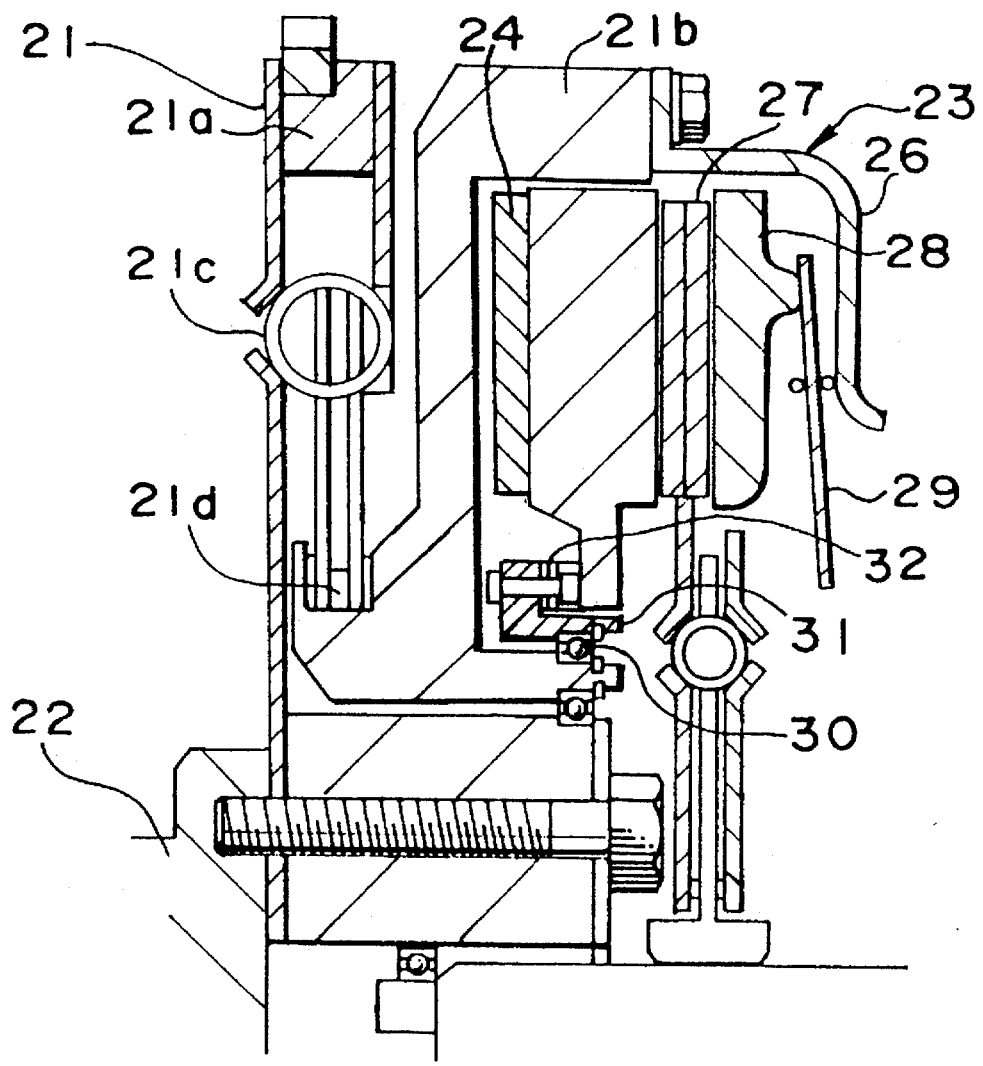
FIG. 11 is a cross-sectional view of an upper half portion of a peak torque decreasing apparatus in accordance with an eleventh embodiment of the invention.

An eleventh embodiment of the invention is illustrated in FIG. 11 and is an improvement of the third embodiment, wherein a clutch facing is attached to an idler mass member so that maintenance is easy.

Throughout all embodiments of the invention, the members having the same structures or functions are denoted with the same reference numerals so that repeated explanation thereon is omitted.

First, the first embodiment of the invention will be explained.

A torque transmittance path of an automobile includes power train members, i.e., an engine, a flywheel, a clutch, a transmission having a synchromesh, propeller shaft, a differential, an axle shaft, a wheel, and a tire arranged in series in that order. The transmission having a synchromesh itself is a known structure.

FIG. 1 illustrates the members located in the vicinity of the clutch in the form of a schematic diagram. A flywheel 21 is coupled to a rear end of an engine crankshaft 22 and rotates together with the crankshaft 22. The flywheel 21 may be an integral-type or a divisional-type, and FIG. 1 shows an integral-type flywheel.

A clutch 23 is coupled to the flywheel 21. The clutch 23 includes a first clutch disk 24, a front cover 38, a clutch cover 26, a second clutch disk 27, a pressure plate 28, and a diaphragm (diaphragm-type clutch spring) 29. The first clutch disk 24 is fixed to the flywheel 21 so that the first clutch disk 24 rotates together with the flywheel 21. The front cover 38 is supported on the flywheel 21 via a bearing 25 so that the front cover 38 is rotatable relative to the flywheel 21. The clutch cover 26 is fixed to the front cover 38 so that the clutch cover 26 rotates together with the front cover 38. The second clutch disk 27 rotates together with the clutch cover 26 and is rotatable relative to the first clutch disk 24. The pressure plate 28 is axially movable and is coupled to the clutch cover 26 via the diaphragm 29 so that the pressure plate 28 rotates together with the clutch cover 26. The diaphragm 29 is supported by the clutch cover 26 and is hydraulically pushed to be deformed to push the pressure plate 28 toward the clutch disk 27 when a clutch pedal is released.

Figure 27:
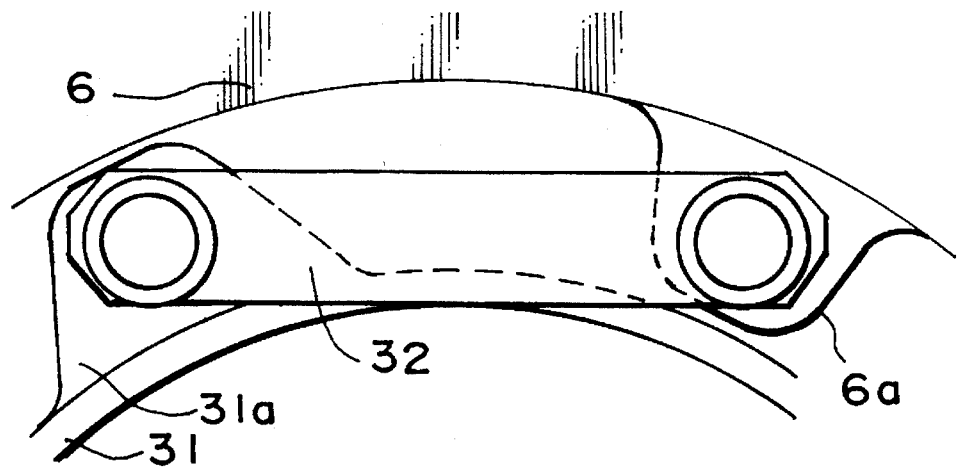
FIG. 27 is an elevational view of a spring plate portion of the apparatus of FIG. 1.
Figure 28:
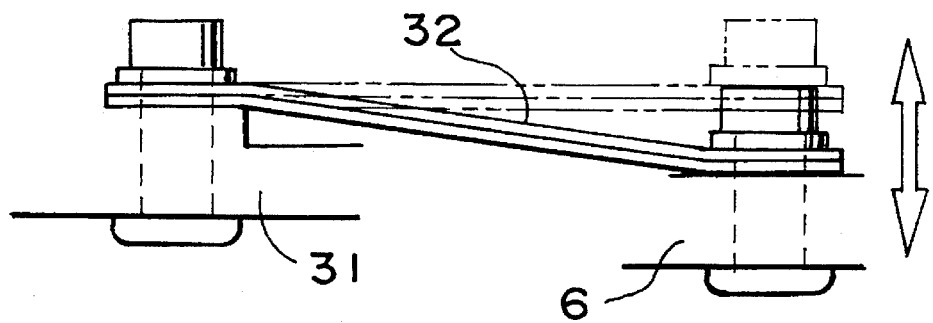
FIG. 28 is a plan view of the spring plate portion of FIG. 27.

An idler mass member 6 is disposed between the first clutch disk 24 and the second clutch disk 27 so as to be rotatable about an axis of the clutch and axially movable. A rotatable member 31, which is coaxial with the flywheel, is rotatably supported on the clutch disk 24 via a bearing 30, and the idler mass member 6 is supported by the rotatable member 31 via a spring plate 32 which allows the idler mass member 6 to axially move relative to the rotatable member 31. More particularly, as illustrated in FIGS. 27 and 28, the rotatable member 31 has a protrusion 31a radially outwardly protruding, and the idler mass member 6 has a protrusion 6a radially inwardly protruding. The spring plate 32 extends in a circumferential direction of the flywheel and is connected to another protrusion 31a at one end of the spring plate 32 and to the protrusion 6a at the other end of the spring plate 32. Elastic bending and deformation of the spring plate 32 allows the idler mass member 6 to move axially relative to the rotatable member 31. In FIG. 1, the idler mass member 6 is disposed in the torque transmittance path through which torque is transmitted from the engine to the wheel and tire. A portion of the torque transmittance path located on an engine side of an engagement/disengagement portion (the clutch disk 24) of the clutch 23 is called a drive side hereinafter, and a portion of the torque transmittance path located on a transmission side of the clutch disk 27 of the clutch 23 is called a driven side hereinafter.

The idler mass member 6 is detached from the drive side and the driven side when the clutch 23 is disengaged, and is brought into contact with the driven side when or before the clutch 23 is engaged. Contact between the idler mass member 6 and the driven side is maintained until the clutch 23 is moved to be disengaged. In this instance, engagement of the clutch 23 means a condition of the clutch on or after the moment when the rotational speed of the driven side has been increased to reach the instant rotational speed of the drive side, and engagement or contact of the idler mass member 6 with the driven side means a condition of the idler mass member 6 on or after the moment when the rotational speed of the driven side has been increased to reach the rotational speed of the instant rotational speed of the driven side.

The drive side includes engine rotational members including a piston and the crankshaft 22 of the engine, the flywheel 21, and the first clutch disk 24. The driven side includes the second clutch disk 27, the transmission and the power train members located on a wheel side of the transmission. FIG. 1 shows a state where the clutch pedal is pushed by a foot and the clutch 23 is disengaged. When pushing the clutch pedal is released, the diaphragm spring 29 pushes the pressure plate 28 toward the second clutch disk 27 and in turn the second clutch disk 27 is brought into contact with the idler mass member 6 to push the idler mass member 6 toward the first clutch disk 24. When the idler mass member 6 contacts the first clutch disk 24, the idler mass member 6 is squeezed between the first clutch disk 24 and the second clutch disk 27. At the same time, rotation of the flywheel 21 transmitted through first clutch disk 24 to the idler mass member 6 and the second clutch disk 27, and the driven side begins rotating. In the first embodiment, engagement of the idler mass member 6 with the driven side and engagement of the clutch 23 occur simultaneously. At a rushed start of the vehicle, the drive side is run-up to a high speed beforehand, and then the clutch is suddenly engaged so that the rotational speed of the driven side is rapidly increased to the high speed.

Figure 12:
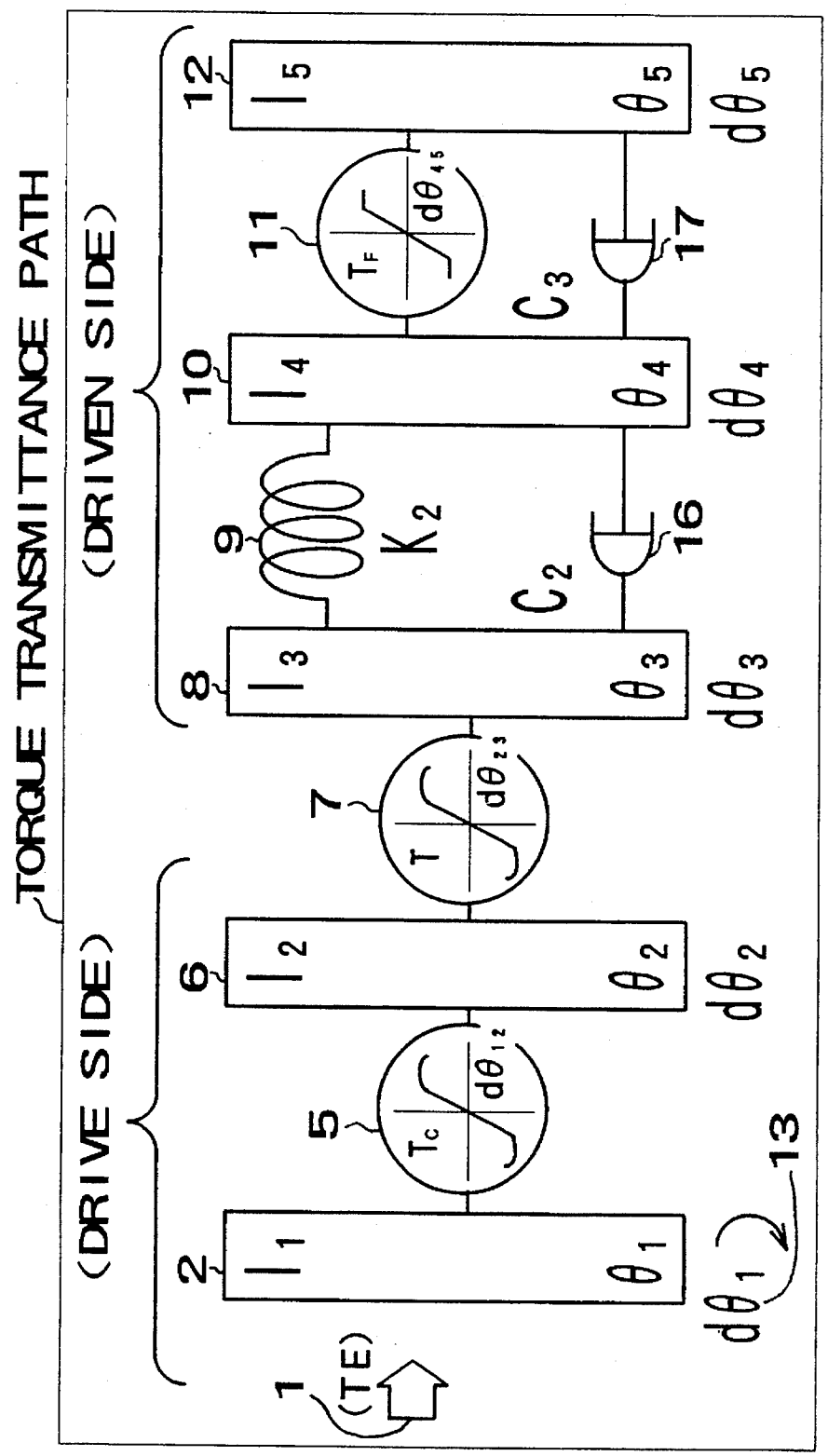
FIG. 12 is a diagram of an analysis model of the peak torque decreasing apparatus in accordance with the first embodiment of the invention.

To analyze angular speeds and torques generated in power train members, the power train having the structure of FIG. 1 is expressed in the form of an analysis model shown in FIG. 12. More particularly, the power train including an automobile body is divided into five principal inertial portions $I_1$, $I_2$, $I_3$, $I_4$, and $I_5$. Torque transmittance characteristics between respective adjacent two portions shown in FIGS. 12, and 18–20 were used in the analysis.

More particularly, the first inertia portion 2 includes the engine rotational portions (the piston, the crankshaft 22, a pulley, etc.), the flywheel 21, and the first clutch disk 24 of the clutch 23, integrally connected to the flywheel 21. $I_1$, $\theta_1$, and $d\theta_1$ express an inertial mass, a rotational angle, and an angular speed, respectively, of the first inertial portion 2. Similarly, the second inertial portion 6 includes the idler mass member 6 (which includes the rotatable member 31 as an inertial rotational angle, and an angular speed, respectively, of tie mass). $I_2$, $\theta_2$, and $d\theta_2$ express an inertial mass, a second inertial portion 6. The third inertial portion 8 includes the second clutch disk 27 of the clutch 23, the transmission, the propeller shaft, and the differential. $I_3$, $\theta_3$, and $d\theta_3$ express an inertial mass, a rotational angle (at the second clutch disk 27), and an angular speed, respectively, of the third inertial portion 8. The fourth inertial portion 10 includes the axle shaft, the wheel, and the tire. $I_4$, $\theta_4$, and $d\theta_4$ express an inertial mass, a rotational angle, and an angular speed, respectively, of he fourth inertial portion 10. The fifth inertial portion 12 includes the automobile body. $I_5$, $\theta_5$, and $d\theta_5$ express an inertial mass, a rotational angle, and an angular speed, respectively, of the fifth inertial portion 12. In this instance, since the inertial mass $I_5$ is very large compared with other inertial masses and therefore the rotational angle $\theta_5$ is very small, the fifth inertial portion 12 affects the fourth inertial portion $I_4$ only through a slip torque of the tire.

Figure 18:
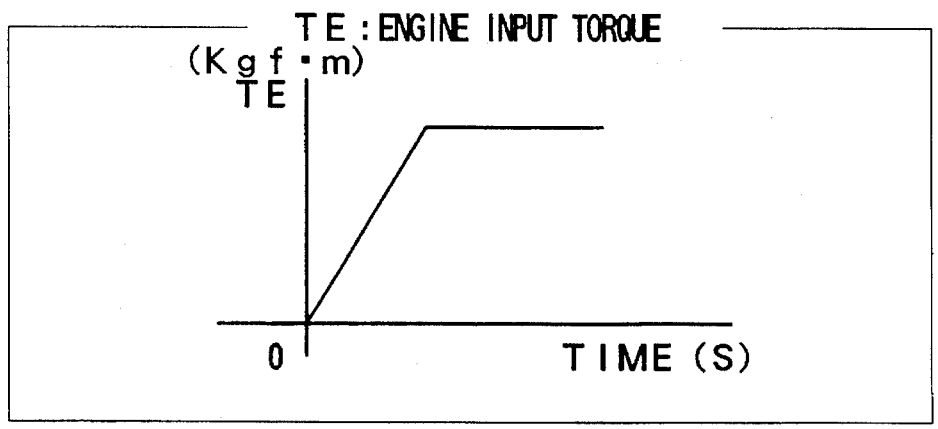
FIG. 18 is a graphical presentation of an engine input torque versus time characteristic.
Figure 19:
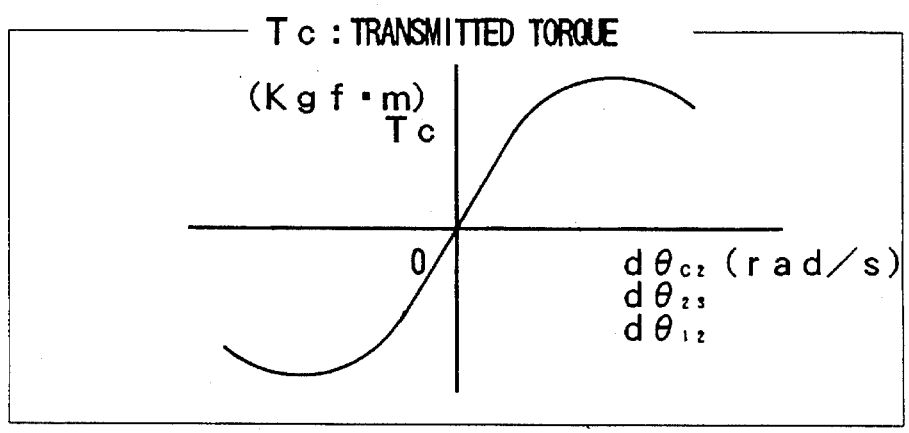
FIG. 19 is a graphical presentation of a transmittance torque versus versus relative speed characteristic of an abrasion material of a clutch disk.
Figure 20:
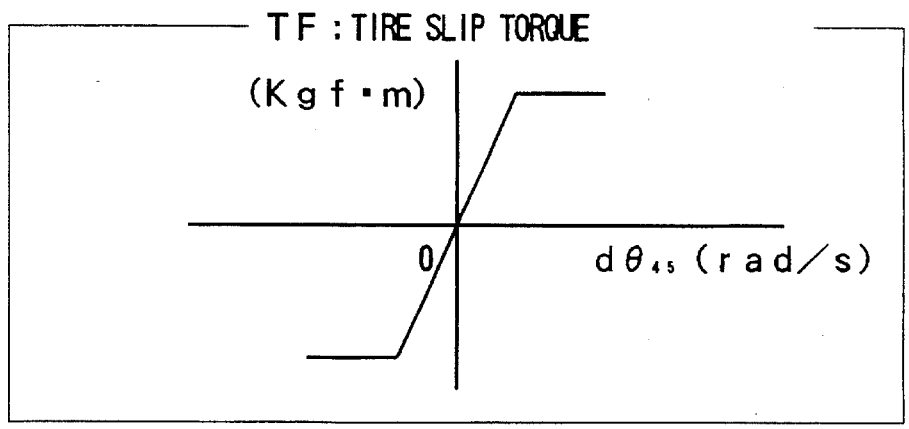
FIG. 20 is a graphical presentation of a transmittance torque versus relative speed characteristic of a tire.

The torque transmittance characteristic is determined as follows: An engine input torque (TE) 1 is fed to the first inertial portion 2. The pattern of this engine input torque TE is shown in FIG. 18, wherein the torque increases until it reaches a certain predetermined torque, and cannot increase further to a torque higher than the predetermined torque.

When the clutch is engaged, torques are generated between the first inertial portion 2 and the idler mass member 6 and between the idler mass member 6 and the third inertial portion 8 due to friction of the first clutch disk 24 and friction of the second clutch disk 27, respectively. As shown in FIG. 12 (see torque transmittance characteristics 5 and 7) and FIG. 19, in the characteristics, the transmittance torques increase with large gradients in proportion to a relative speed $d\theta_{12}$ between the adjacent two portions (a differential between $d\theta_1$ and $d\theta_2$) and a relative speed $d\theta_{23}$ between the adjacent two portions (a differential between $d\theta_2$ and $d\theta_3$), respectively, up to certain levels. After they reach the levels, they further increase with small gradients and then decrease with small gradients.

A synthetic torsional spring 9 having a spring constant $K_2$ and a synthetic viscous damping 16 of a damping factor $C_2$ of the power train members of the transmission, the propeller shaft, the axle shaft, and the tire act between the third inertial portion 8 and the fourth inertial portion 10. Further, a tire slip torque $(T_F)$ transmittance characteristic 11 shown in FIGS. 12 and 20 and a viscous damping 17 due to slippage between the tire and the ground act between the fourth inertial portion 10 and the fifth inertial portion 12.

Analysis simulating a rushed start of an automobile was conducted using the above-described model. In the analysis, angular speeds generated at the first inertial portion (having an inertial mass $I_1$), the third inertial portion (having an inertial mass $I_3$), and the fourth inertial portion (having an inertial mass $I_4$), and torques generated in the driven side at the rushed start were obtained. In the analysis, the following equations were used, though different equations might be used.

$$I_1\ddot{\theta}_1 = TE - T_{C1}$$

$$I_2\ddot{\theta}_2 = T_{C1} - T_{C2}$$

$$I_3\ddot{\theta}_3 = -K_2(\theta_3 - \theta_4) - C_2(d\theta_3 - d\theta_4) + T_{C2}$$

$$I_4\ddot{\theta}_4 = K_2(\theta_3 - \theta_4) + C_2(d\theta_3 - d\theta_4) - C_3(d\theta_4 - d\theta_5) - T_F$$

$$I_5\ddot{\theta}_5 = C_3(d\theta_4 - d\theta_5) + T_F$$

Figure 21:
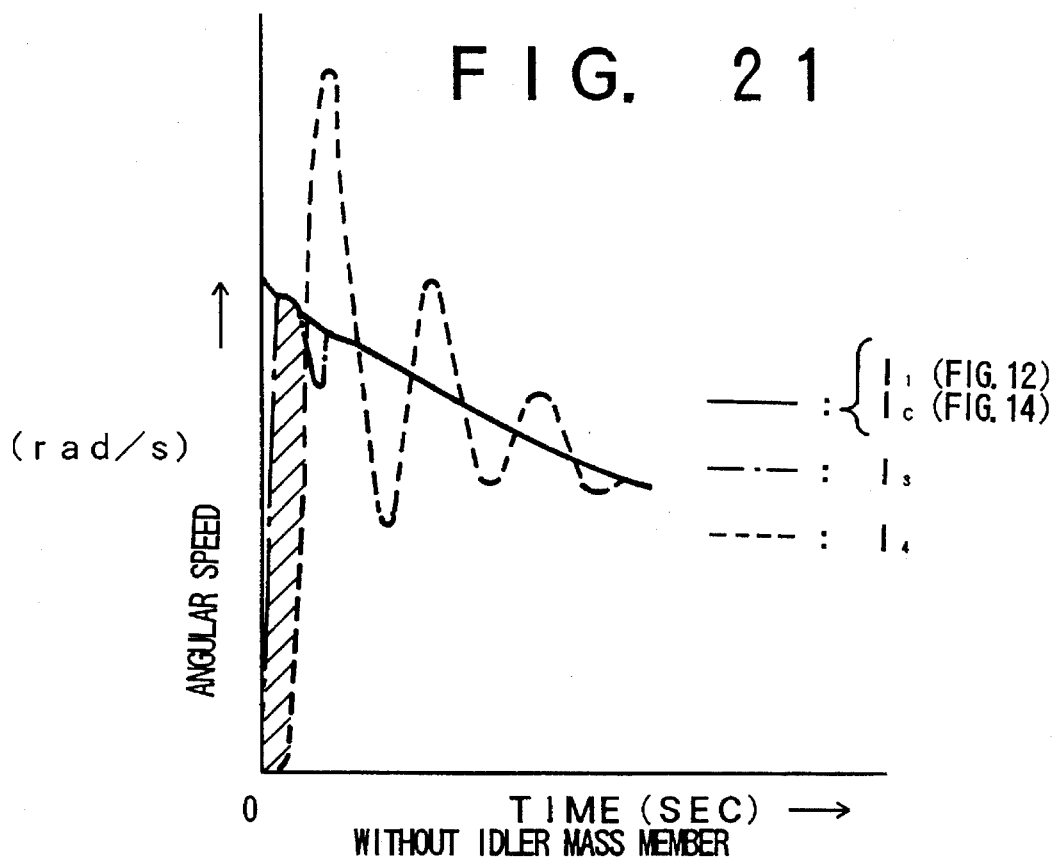
FIG. 21 is a graphical presentation of angular speed versus time characteristics of typical inertial mass portions in a case where no idler mass member is provided.
Figure 22:
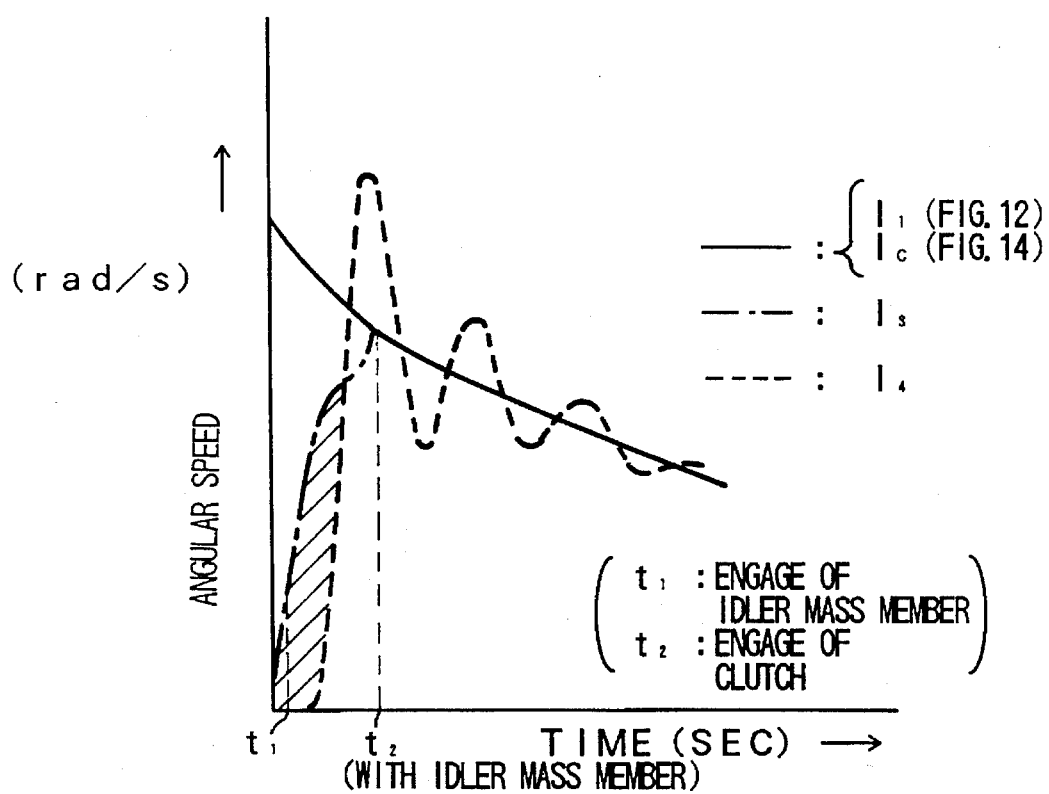
FIG. 22 is a graphical presentation of angular speed versus time characteristics of typical inertial mass portions in a case where an idler mass member is provided.
Figure 23:
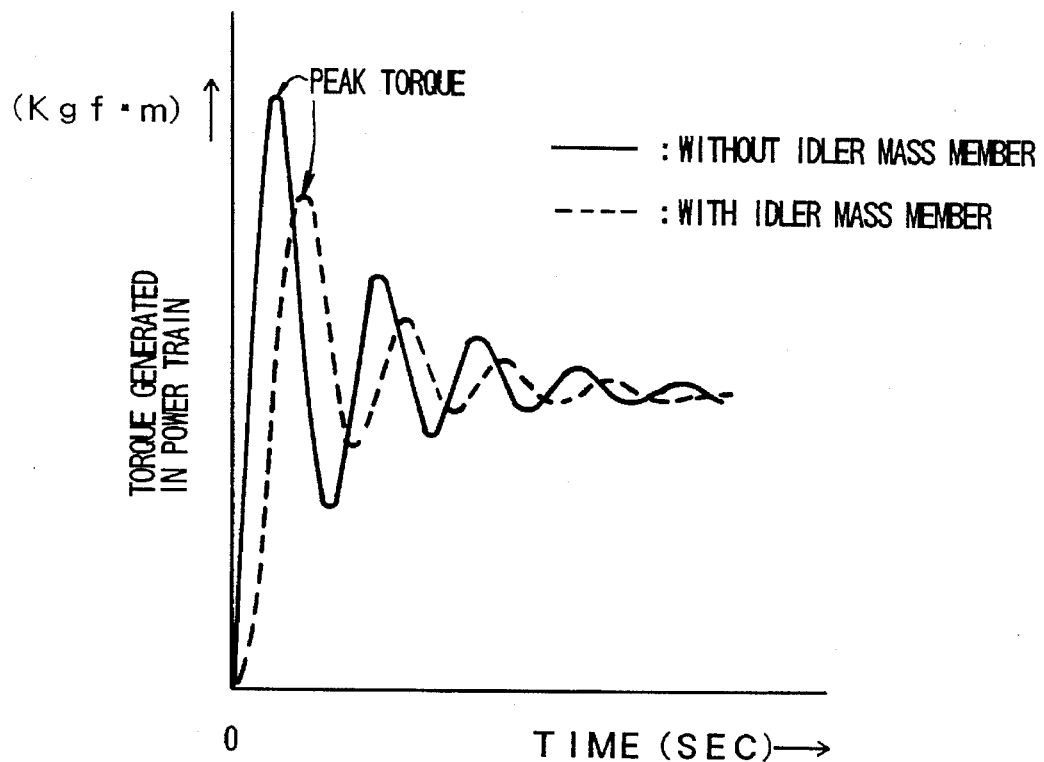
FIG. 23 is a graphical presentation of a torque generated in a power train versus time characteristic.
Figure 26:
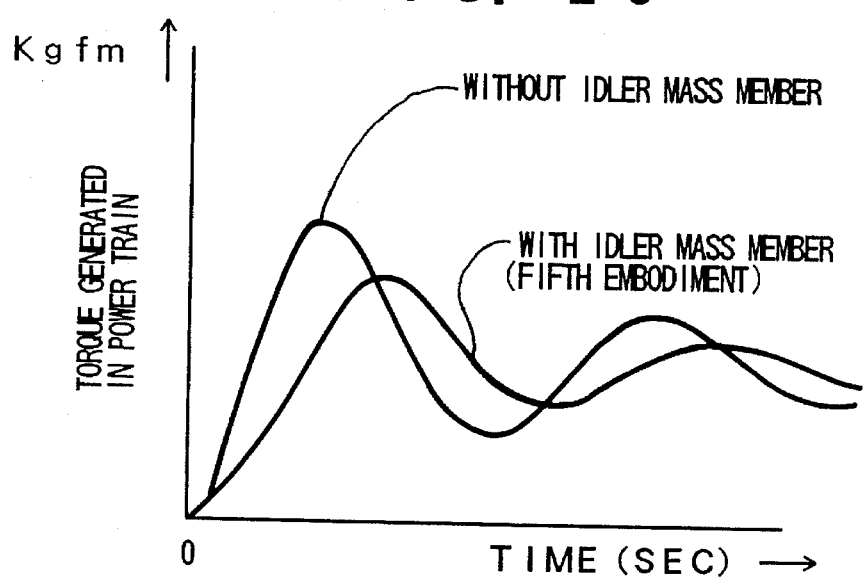
FIG. 26 is a graphical presentation of a torque generated in the power train versus time characteristic of the fifth embodiment in accordance with the fifth embodiment of the invention.

The results of the analysis are shown in FIGS. 22 and 23. FIG. 21 shows results of an apparatus having no idler mass member for comparison.

In the analysis, an initial angular speed of the first inertial portion 2 was determined to be 314.15 rad/sec (corresponding to 3,000 rpm) to simulate a rushed start of the automobile. Initial angular speeds of the other inertial portions were determined to be zero. Further, in the analysis, the inertial masses $I_1$, $I_3$, $I_4$, and $I_5$ were set to be $2.9 \times 10^{-2}$ Kgf m s$^2$, $1.2 \times 10^{-3}$ Kgf m s$^2$, $1.1 \times 10^{-3}$ Kgf m s$^2$, $8.8 \times 10^{-2}$ Kgf m s$^2$, respectively. The inertial mass 12 of the idler mass member 6 was selected to be $1.6 \times 10^{-2}$ Kgf m s$^2$ in the analysis.

For the torque generated in the power train, a torque generated in the propeller shaft was used. The torque generated in the propeller shaft corresponds to a torque between $I_3$ and $I_4$, and is calculated based on the following equation:

$$T = i_1 \times (K_2 \times (\theta_3 - \theta_4) + C_2 \times (d\theta_3 - d\theta_4))$$

where,

T: torque generated in the power train (Kgf m)

$i_1$: first gear ratio of the transmission $\theta_3$: rotational angle of the third inertial portion (rad)

$\theta_4$: rotational angle of the fourth inertial portion (rad)

$d\theta_3$: angular speed of the third inertial portion (rad/sec)

$d\theta_4$: angular speed of the fourth inertial portion (rad/sec)

$K_2$: synthetic spring constant of the spring 9 (see FIG. 12) (Kgf m/rad)

$C_2$: synthetic damping factor of the viscous damping 16 (see FIG. 12) (Kgf m s)

Angular speeds of inertial portions of a four inertial mass model having no idler mass member and angular speeds of inertial portions of a five inertial mass model having an idler mass member of FIG. 12 are shown in FIG. 21 and FIG. 22, respectively. Areas of hatched portions of FIGS. 21 and 22 are a relative angular displacement, i.e., $(\theta_3 - \theta_4)$, between the third and fourth inertial portions $I_3$ and $I_4$, because the areas are a product of a relative angular speed and time. This relative angular displacement is substantially proportional to T, because $C_2$ is very small.

As understood from comparison between FIGS. 21 and 22, the angular speed $d\theta_3$ of the third inertial portion having inertial mass $I_3$ of the model having an idler mass member increases with a smaller gradient than the angular speed of the third inertial portion having no idler mass portion, and the moment when the third inertial portion begins to engage the first inertial portion, of the model having an idler mass member is delayed compared with that of the model having no idler mass member. As a result, the area of the hatched portion of the model having an idler mass member is smaller than that of the model having no idler mass member, which means that the peak torques generated in the model having an idler mass member are lower than that of the peak torques generated in the model having no idler mass member, as shown in FIG. 23. More particularly, the peak torque, 197 Kgf m in the case where no idler mass member is provided is decreased to a peak torque, 138 Kgf m in the case where an idler mass member is provided, and the decrease ratio can be as large as 30.0%.

The second embodiment of the invention will now be explained with reference to FIGS. 2 and 13.

An idler mass member 6 is disposed between a first clutch disk 24 and a second clutch disk 27. A rotatable member 31 is rotatably supported on a flywheel 21 via a bearing 30 so as to be coaxial with the flywheel 21. The idler mass member 6 is supported by the rotatable member 31 via a spring plate 32 which allows the idler mass member 6 to move axially relative to the rotatable member 31. As a result, the idler mass member 6 is rotatable about an axis of the apparatus and is axially movable. The idler mass member 6 has an inertial mass $I_2$.

The idler mass member 6 is detached from the first clutch disk 24 and the second clutch disk 27 when the clutch 23 is disengaged. Thus, though the drive side rotates, the driven side and the idler mass member 6 do not rotate when the clutch 23 is disengaged. When the clutch 23 is engaged, the diaphragm 29 pushes the pressure plate 28 to thereby push the second clutch disk 27 against the idler mass member 6. At this instance, the first clutch disk 24 receives and bears the pushing force of the idler mass member 6. As a result, the idler mass member 6 is squeezed between the first and second clutch disks 24 and 27 to rotate, and the driven side also rotates. Thus, engagement of the idler mass member 6 with the driven side and engagement of the drive side with the driven side occur simultaneously.

A torque transmittance path includes two path portions. One is a path portion for transmitting torques from a flywheel 21 to the second clutch disk 27 through the first clutch disk 24 and the idler mass member 6, and another is a path portion for transmitting torques from the flywheel 21 to the second clutch disk 27 through a clutch cover 26, a diaphragm 29, and a pressure plate 28. Therefore, the idler mass member 6 is disposed in one of the two path portions.

FIG. 13 illustrates an analysis model simulating the apparatus of the second embodiment. The model of FIG. 13 is the same as that of FIG. 12 of the first embodiment except that a bypass connecting first and third inertial portions $I_1$ and $I_3$ so as to bypass a second inertial portion $I_2$ is added in the second embodiment. This added bypass portion transmits a torque through the clutch cover 26, the diaphragm 29, and the pressure plate 28.

In the bypass portion, there is a torque transmittance due to the second clutch disk 27, the characteristic of which is shown in a circle 18 of FIG. 13. In the torque transmittance characteristic, the transmittance torque increases with a large gradient in proportion to a relative speed $d\theta_{13}$ between the first and third inertial portions, and after it reaches a predetermined torque, it increases with a small gradient and then decreases with a small gradient.

In the model of FIG. 13, $I_3$ expresses a total inertial mass of the clutch disk 27, the transmission, the propeller shaft, and the differential. A portion from $I_3$ to $I_6$ is the same as that of the first embodiment.

Analysis similar to the analysis conducted for the first embodiment was conducted simulating a rushed start of an automobile. In the analysis, the inertial mass $I_1$ of the first inertial portion was selected to be $4.0 \times 10^{-2}$ Kgf m s$^2$, and the inertial mass $I_2$ of the second inertial portion was selected to be $0.5 \times 10^{-2}$ Kgf m s$^2$. The inertial masses $I_3$, $I_4$, and $I_5$ were the same as those of the first embodiment. The results of the analysis were substantially the same as the results shown in FIGS. 21, 22, and 23. More particularly, the peak torque was decreased from 197.00 Kgf m obtained in the case of no idler mass member to 165 Kgf m obtained in the case where an idler mass member was provided, that is, the peak torque was decreased by about 16%. The other structures and operation thereof are the same as those of the first embodiment.

The third embodiment of the invention will be explained with reference to FIGS. 3 and 14.

In FIG. 3, a drive side includes rotational portions of the engine including a crankshaft 22, a divisional type flywheel 21 (wherein two inertial mass portions 21a and 21b are connected by a series assembly of a spring 21c and a torque limiter 21d), a first clutch disk 24, a clutch cover 26, a diaphragm 29, and a pressure plate 28. A driven side includes a second clutch disk 27, a transmission including a synchromesh, a propeller shaft, a differential, an axle shaft, a wheel, a tire, and an automobile body.

An idler mass member 6 is disposed between the first and second clutch disks 24 and 27. A rotatable member 31 is rotatably supported on the inertial mass portion 21b of the flywheel 21 via a bearing 30, and the idler mass member 6 is supported by the rotatable member 31 via a spring plate 32 which allows the idler mass member 6 to move axially relative to the rotatable member 31. The idler mass member 6 is detached from the drive side and the driven side when the clutch 23 is disengaged, and is brought into engagement or contact with the driven side when or before the clutch 23 is moved to be engaged.

FIG. 14 illustrates an analysis model of the apparatus of the third embodiment of the invention. In FIG. 14, $I_1$ expresses a total inertial mass of rotatable portions divisional type flywheel 21, and $I_c$ is a total inertial mass of the engine and the inertial mass portion 21a of the of the inertial mass portion 21b of the flywheel 21, a clutch cover 26, a pressure plate 28, and the first clutch disk 24. Further, like the second embodiment, $I_2$ is an inertial mass of the idler mass member 6; $I_3$ is a total inertial mass of the second clutch disk 27, the transmission, the propeller shaft, and the differential; $I_4$ is a total inertial mass of the axle shaft, the wheel, and the tire; and $I_5$ is an inertial mass of the automobile body.

A torque transmittance path includes two path portions: one is a path portion through the idler mass member 6, and the other is a path portion through the clutch cover 26. The idler mass member 6 is disposed in one of the two path portions.

Analysis was conducted in the same way as that of the second embodiment, simulating a rushed start condition of the automobile. Results similar to those of the second embodiment were obtained. More particularly, in the analysis, $I_1$, $I_2$, and $I_c$ were selected to be $2.4 \times 10^{-2}$ Kgf m s$^2$, $0.593 \times 10^{-2}$ Kgf m s$^2$, and $1.5 \times 10^{-2}$ Kgf m s$^2$, respectively, and $I_3$, $I_4$, and $I_5$ were selected to be the same as those of the second embodiment. The results of the analysis showed that the peak torque decrease rate was about 16%. Other structures and operation of the third embodiment are the same as those of the second embodiment.

The fourth embodiment of the invention will be explained with reference to FIGS. 4 and 15.

In the fourth embodiment, a drive side includes rotatable portions of an engine including a crankshaft 22, an integral type flywheel 21, and a first clutch disk 24. A driven side includes a second clutch disk 27, a transmission having a synchromesh, a propeller shaft, a differential, an axle shaft, a wheel, a tire, and an automobile body. An idler mass member 6 is disposed between the drive side and the driven side. Inertial masses of a clutch cover 26, a diaphragm 29, and a pressure plate 28 are added to the idler mass member 6.

A rotatable member 31 is rotatably supported on the flywheel 21 via a bearing 30, and the idler mass member 6 is supported on the rotatable member 31 via a spring plate 32 which allows the idler mass member 6 to axially move relative to the rotatable member 31.

The idler mass member 6 is detached from the drive side and the driven side when the clutch 23 is disengaged, and is brought into engagement or contact with the driven side when or before the clutch is turned to be engaged.

A torque transmittance path includes two path portions: one is a path portion through the idler mass member 6 and the clutch cover 26, and the other is a path portion through the second clutch disk 27. The idler mass member 6 is disengaged in one of the path portions only.

An analysis model for the fourth embodiment of the invention is shown in FIG. 15. The analysis model of the fourth embodiment is the same as that of the second embodiment of the invention except that $I_2$ of the fourth embodiment includes inertial masses of the clutch cover 26 and the diaphragm 29 as well as an inertial mass of the idler mass member 6, though $I_2$ of the second embodiment includes an inertial mass of the idler mass member 6 only. In the fourth embodiment, a peak torque decreasing effect similar to that of the second embodiment was obtained, though the peak torque decreasing effect of the fourth embodiment is greater than that of the second embodiment because 12 of the fourth embodiment is greater than that of the second embodiment. More particularly, in the analysis $I_1$ was selected to be $2.9 \times 10^{-2}$ Kgf m s$^2$; $I_2$ was selected to be $1.6 \times 10^{-2}$ Kgf m s$^2$; and $I_3$, $I_4$, and $I_5$ were selected to be the same as those of the second embodiment. It was found in the analysis that a peak torque decreasing rate of about 30% was obtained.

The other structures and operation thereof of the fourth embodiment are the same as those of the second embodiment.

The fifth embodiment of the invention, wherein an idler mass member is disposed outside a torque transmittance path, will be explained with reference to FIGS. 5 and 16.

In the fifth embodiment, a drive side includes rotatable portions of an engine including a crankshaft 22, an integral type flywheel 21, a clutch cover 26 coupled in a fixed manner to the flywheel 21, a diaphragm 29, and a pressure plate 28. A driven side includes a clutch disk 27, a transmission including a synchromesh, a propeller shaft, a differential, an axle shaft, a wheel, a tire, and an automobile body arranged in that order. An idler mass member 6 is rotatably supported on the flywheel 21 via a bearing 30. The idler mass member 6 is axially immovable relative to the flywheel 21.

The idler mass member 6 is detached from the drive side and the driven side when the clutch 23 is disengaged, and is brought into engagement and contact with the driven side when or before the clutch 23 is turned to be engaged. The idler mass member 6 bears a pushing force from the clutch disk 27.

A torque transmittance path passes through the flywheel 21, the clutch cover 26, the diaphragm 29, the pressure plate 28, and the clutch disk 27 arranged in that order. The idler mass member 6 is disposed outside the torque transmittance path.

FIG. 16 illustrates an analysis model for the apparatus of the fifth embodiment of the invention. $I_1$ expresses a total inertial mass of the engine rotatable portions, the flywheel 21, the clutch cover 26, the diaphragm 29, and the pressure plate 28; $I_2$ expresses an inertial mass of the idler mass member 6; $I_3$ is a total inertial mass of the clutch disk 27, the transmission, the propeller shaft, and the differential; $I_4$ expresses a total inertial mass of the axle shaft, the wheel, and the tire; and $I_5$ is an inertial mass of the automobile body. Torque transmittance characteristics between adjacent two inertial portions are the same as those of the first embodiment.

Analysis was conducted simulating a rushed start condition of the automobile. In the analysis, $I_1$ was selected to be $4.0 \times 10^{-2}$ Kgf m s$^2$ (which includes an inertial mass of the flywheel, $1.6 \times 10^{-2}$ Kgf m s$^2$); $I_2$ was selected to be $0.5 \times 10^{-2}$ Kgf m s$^2$; and $I_3$, $I_4$, and $I_5$ were set at the same values as those of the first embodiment. An initial speed $d\theta_1$ was selected to be 3,000 rpm (i.e., 314.15 rad/sec). The analysis results are shown in FIGS. 23, 24, and 25, and show the same trend as that of the first embodiment of the invention. A peak torque was decreased from 197 Kgf m of the case of no idler mass member to 165 Kgf m of the case having an idler mass member provided, and the peak torque decreasing rate was about 16%.

The other structures and operation of the fifth embodiment of the invention are the same as those of the second embodiment of the invention.

The sixth embodiment of the invention will be explained with reference to FIGS. 6 and 17. A peak torque decreasing apparatus of the sixth embodiment is the same as that of the second embodiment of the invention except that the apparatus of the sixth embodiment further includes a second idler mass member 36 as well as a first idler mass member 6 which corresponds to the idler mass member 6 of the second embodiment of the invention. The second idler mass member 36 is disposed outside a torque transmittance path, while the first idler mass member 6 is disposed in the torque transmittance path. The second idler mass member 36 is engaged and disengaged with the driven side by means of an electric-magnetic clutch 35.

More particularly, as shown in FIG. 6, the second idler mass member 36 is rotatably supported by an input shaft 33 of the transmission via a bearing 34. The electric-magnetic clutch 35 is disposed between the second idler mass member 36 and a member fixed to the input shaft 33. When the clutch 35 is turned to "ON", the second idler mass member 36 is engaged with the input shaft 33, and when the clutch 35 is turned to "OFF", the engagement is released.

The electric-magnetic clutch 35 is turned to "ON" in a case where the engine speed is too high to be absorbed by the first idler mass member 6 only and in a case where the engine speed changes with a too large gradient to be absorbed by the first idler mass member 6.

FIG. 17 illustrates an analysis model for the apparatus of the sixth embodiment of the invention, which includes an inertial portion $I_6$ added to a portion equal to the model of the second embodiment. Analysis was conducted, and the same results as those of the second embodiment were obtained when the second idler mass member 36 was not engaged with the driven side. Further, from the analysis, it was found that when the second idler mass member 36 was engaged with the driven side, the torque transmittance curve versus time curve stood with a smaller gradient than that of the case of no second idler mass member, and that the magnitude of the peak torque generated in the power train was decreased due to the addition of the second idler mass member 36.

The other structures and operation of the sixth embodiment of the invention are the same as those of the second embodiment of the invention.

The seventh embodiment of the invention, which is an improvement of the second and sixth embodiments of the invention, will be explained with reference to FIG. 7.

In the seventh embodiment, the flywheel 21 and the crankshaft 22 are coupled to each other via a drive plate 38 which comprises an annular plate coaxial with the crankshaft 22. The drive plate 38 is fixed to the crankshaft 22 by set bolts 39 at a radially inner portion of the drive plate 38, and the flywheel 21 is fixed to the drive plate 38 by bolts at a radially outer portion of the drive plate 38. A corner of a radially inner portion of the flywheel 21 is cut to thereby provide a space for locating the heads of the set bolts 39 therein. Due to this arrangement, the length of the set bolts 39 are shortened compared with the case of FIG. 2. The shortening of the bolts 39 provides a space ahead of the bolts, where the bearing 30, for supporting the rotatable member 31 on the flywheel 21, is located so that the bearing 30 is down-sized in the radial direction thereof. This down-sizing of the bearing 30 increases a space for disposing the spring plate 32 therein and makes designing the spring plate easy. Further, due to the down-sizing of the bearing 30, the idler mass member 6 can be extended radially inwardly and the inertial mass of the idler mass member 6 can be increased so that the peak torque decreasing effect is increased.

The other structures and operation thereof are the same as those of the second and sixth embodiments of the invention.

The eighth embodiment of the invention, which is an improvement of the second embodiment of the invention, will be explained with reference to FIG. 8.

In the eighth embodiment, the idler mass member 6 is spline-engaged with the rotatable member 31 which is rotatably supported on the flywheel 21 via the bearing 30. Due to this spline-engagement, the idler mass member 6 is axially movable relative to the rotatable member 31 and rotates together with the rotatable member 31. A cone spring 41 is disposed between the rotatable member 31 and the idler mass member 6 and biases the idler mass member 6 toward the clutch disk 27 in the axial direction. The clutch facing 24 is attached and fixed to the idler mass member 6.

When the clutch facing 24 has been worn due to abrasion, the idler mass member 6 with the clutch facing 24 only should be exchanged leaving the rotatable member 31, because the idler mass member 6 is separated from the rotatable member 31. Therefore, the maintenance is easy.

The other structures and operation thereof are the same as those of the second embodiment of the invention.

The ninth embodiment of the invention, which is an improvement of the second embodiment, will be explained with reference to FIG. 9.

In the ninth embodiment, the idler mass member 6 is supported on the rotatable member 31 via a rubber member 42. An outer end of the rubber member 42 is connected to an inner end of the idler mass member 6 through, for example, vulcanization, and an inner end of the rubber member 42 is connected to an outer end of the rotatable member 31 through, for example, vulcanization. The rotatable member 31 is rotatably supported on the flywheel 21 via the bearing 30. Axial movement of the idler mass member 6 at the time of engagement and disengagement of the clutch 23 is possible due to deformation of the rubber member 42. Using the rubber member 42 can eliminate the spring plate and therefore be less expensive.

The other structures and operation of the ninth embodiment are the same as those of the second embodiment of the invention.

The tenth embodiment of the invention, which is an improvement of the second embodiment of the invention, will be explained with reference to FIG. 10.

In the tenth embodiment, the idler mass member 6 is coupled to the clutch disk 27 so that the idler mass member 6 can be dismounted together with the clutch disk 27 when the clutch facing 24 is worn due to abrasion.

More particularly, an inner cylindrical portion of the clutch disk 27 is axially extended inside the idler mass member 6. The rotatable member 31 is rotatably supported on the extended cylindrical portion of the clutch disk 27 via the bearing 30, and the idler mass member 6 is coupled to the rotatable member 31 via a spring plate 32. The clutch facing 24 is attached to the idler mass member 6.

When the clutch facing 24 has been worn due to abrasion, in the tenth embodiment, the clutch disk 27 together with the idler mass member 6 should only be exchanged, which is easier in maintenance than the second embodiment where the flywheel with the idler mass member should be exchanged.

The other structures and operation of the tenth embodiment of the invention are the same as those of the second embodiment of the invention.

The eleventh embodiment of the invention, which is an improvement of the third embodiment of the invention, will be explained with reference to FIG. 11.

In the eleventh embodiment, the clutch facing 24 is attached to the idler mass member 6, though the clutch facing 24 is attached to the flywheel in the third embodiment. The clutch facing 24 is adhered to the idler mass member 6 by means of, for example, adhesive.

When the clutch facing 24 has been worn due to abrasion, in the eleventh embodiment the idler mass member 6 with the clutch 24 should only be exchanged, which is much easier in maintenance than the third embodiment where the mission side flywheel 21b with the clutch facing 24 and engine side flywheel 21a should be exchanged.

The other structures and operation of the eleventh embodiment are the same as those of the third embodiment of the invention.

In accordance with the present invention, since the idler mass member is provided and is brought into contact or engagement with the driven side of the power train on or before engagement of the clutch, peak torques generated in the driven side of the power train are decreased. As a result, the design torque for the driven side can be small, and thus the power train members of the driven side can be downsized and lightened. Further, the manufacturing cost of the power train can be decreased.

Although only eleven embodiments of the invention have been described in detail above, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A peak torque decreasing apparatus for an automobile power train comprising:

a drive side assembly;

a driven side assembly including a transmission having a synchromesh;

a clutch, including a clutch disk disposed between the drive side assembly and the driven side assembly for connecting and disconnecting the drive side assembly and the driven side assembly when the clutch is engaged and disengaged respectively, the driven side assembly, the driven side assembly, and the clutch constructing a torque transmittance path from an automobile engine to an automobile wheel; and an idler mass member;

means for disengaging said idler mass member from both said drive side assembly and said driven side assembly when said clutch is disengaged; and means for engaging said idler mass member directly with said clutch disk to engage said idler mass member with said driven side assembly when said clutch is engaged.

2. An apparatus according to claim 1, wherein the drive side assembly includes a flywheel, and the clutch includes a pressure plate, and wherein the idler mass member is disposed between the flywheel and the pressure plate rotatably and axially movable relative to the flywheel via a bearing and a spring, so that the idler mass member is brought into contact with the drive side assembly and the driven side assembly when the pressure plate is moved toward the flywheel.

3. An apparatus according to claim 1, wherein the drive side assembly includes a flywheel on which a rotatable member is rotatably supported, and wherein the idler mass member is coupled to the rotatable member via a spring plate which extends in a circumferential direction of the flywheel and has opposite ends, one of which is connected to the idler mass member and the other of which is connected to the rotatable member.

\* \* \* \* \*